Oct. 23, 1956  S. MOON ET AL  2,767,595
TRANSMISSION LOCK
Filed July 18, 1955
FIG. 1
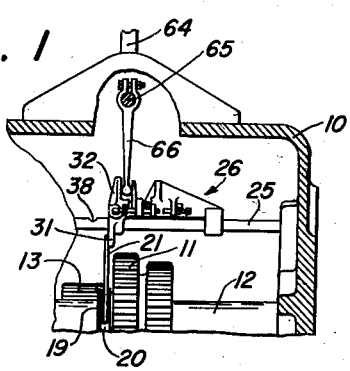
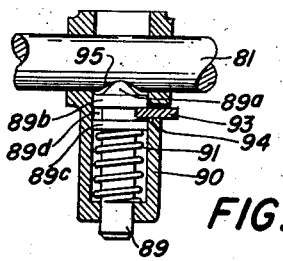
FIG. 6
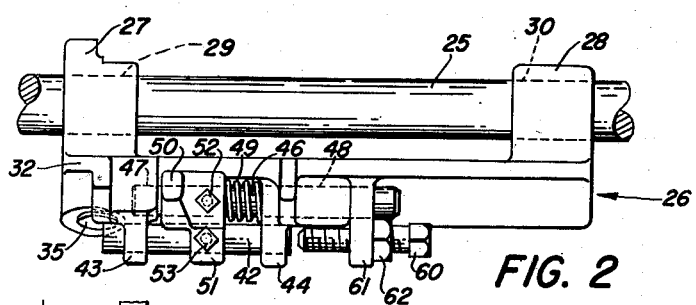
FIG. 2
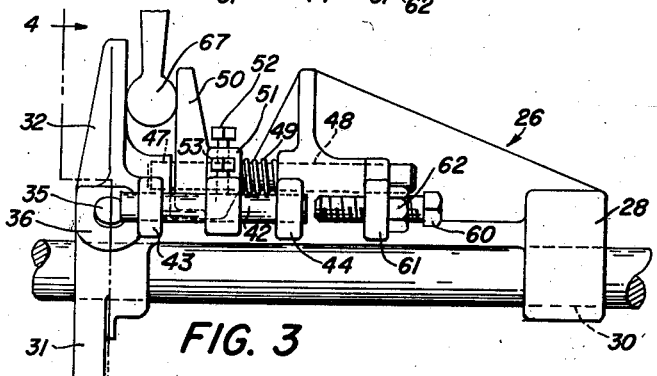
FIG. 3
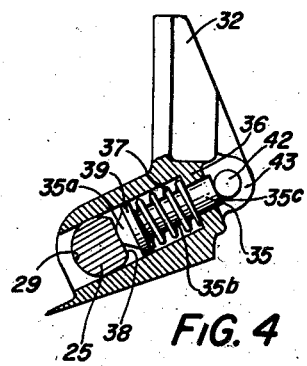
FIG. 4
FIG. 5
INVENTOR.
SEATON MOON,
DWIGHT H. PEARSON &
VICTOR K. YODEN

United States Patent Office 2,767,595
Patented Oct. 23, 1956

2,767,595

TRANSMISSION LOCK

Seaton Moon, Waterloo, Dwight H. Pearson, Cedar Falls, and Victor K. Yoden, Waterloo, Iowa, assignors to Deere Manufacturing Co., Dubuque, Iowa, a corporation of Iowa Application July 18, 1955, Serial No. 522,758

11 Claims. (Cl. 74—477)

This invention relates to a locking mechanism for use with a gear shift transmission, having a part therein shiftably responsive to adjustments of a gear shift lever to move to and from an operative position. More particularly, this relates to a lock which positively prevents shifting of the gears other than through operation of the gear shift lever which is normally done by the operator.

A problem of no small degree has been encountered in the transmission art and particularly in the type of transmission used in tractor or other draft loaded vehicles in which there is a natural tendency for the gears to creep out of engagement, due to normal vibrations created in the type of work done or to axial thrusts resulting from the extremely large draft load often required to be drawn. Several mechanisms have been employed to alleviate this condition which have had varying degrees of success. One of the more common methods employed is to provide a spring loaded detent which engages a complementary notch in a shaft of the transmission when the shiftable gear is in operative position thereby resisting further movement of the gear by a force proportionate to the strength of the spring. The difficulty generally arising from this type of lock is the inadequacy of it in that if the spring is of considerable strength, it is difficult to shift the gears when it is so desired, or if the spring is of relatively small strength, it reduces the holding force of the detent. Therefore, while this method is a step in the right direction, it is not the solution to the problem.

It is, therefore, the primary object of this invention to provide and to incorporate, with the above described type of detent, a positive locking device which will positively prevent the detent from unlocking or disengaging the shift when the gear is in an operative position and which may, when it is desired to move the gear to an inoperative position, be easily disengaged, thereby permitting normal shifting of the gear by the gear shift lever.

It is also an object of the present invention to provide a gear shift lock which will automatically be engaged when the shiftable gear is in operative position and which may be disengaged without movement of the gear shift lever or of other operative parts other than that normally required to shift the gears.

Other objects and advantages of the invention will become apparent to those skilled in the art as the nature of the invention is better understood from the following detailed description illustrated in the accompanying drawings.

Fig. 1 is a cutaway and sectional view of a portion of a transmission incorporating the invention.

Fig. 2 is a plan view of a shifter and a portion of the shifter shaft used in the transmission and showing one form of the invention.

Fig. 3 is a front view of the parts shown in Fig. 2.

Fig. 4 is a sectional view taken along the line 4—4 of Fig. 3.

Fig. 5 is a front view of the shifter member and a portion of the shifter shaft similar to Fig. 3 and showing a modification of the invention.

Fig. 6 is a sectional view taken along line 6—6 of Fig. 5.

The transmission is assembled in a transmission housing 10 which is suitably supported on a vehicle. Within the housing 10, a gear cluster 11 is slidably supported for axial adjustment on a gear shaft 12, which has opposite ends thereof supported by the housing 10. The gear cluster 11 is shiftably adjustable to move in an operative or meshed relation with a complementary gear 13, which is mounted on a second gear shaft, not shown, which is also suitably supported by the transmission housing 10. Fig. 1 shows the cluster 11 in an inoperative position relative to the gear 13, the operative position being in existence when the gear cluster 11 is moved to the left to engage the gear 13. The gear arrangement within the transmission is herein shown and described as comprising only a simple arrangement with a single shifter for moving the gear cluster 11 to and from a meshed position with the gear 13. The simple arrangement is shown for purposes of explanation only so that the invention may be fully and completely understood and it should be recognized that the present locking device or one similar to it may be utilized either with a plurality of gear arrangements or with various modifications of the present arrangement.

The gear cluster 11 has an axially extending hub portion 19 with a circumferential slot 20 cut therein for receiving a shift fork 21. In the upper portion of the transmission housing 10 is a shifter shaft 25 which has opposite ends affixed in the walls of the housing and which is disposed substantially parallel to the gear shaft 12. A shifter or carrier member 26 is supported on the shifter shaft 25 by spaced-apart and integral lug portions 27, 28 which are suitably apertured, as at 29 and 30, to permit axial movement of the shifter member 26 along the shaft 25. A depending arm portion 31 of the member 26 is fixed, as by welding or other suitable means, to the shift fork 21. The gear cluster 11 will therefore move to its operative or meshed position relative to the gear 13 in response to axial movement of the shifter member 26 along the shifter shaft 25. Also provided on the shifter member 26, for purposes which will later become apparent, is an upwardly projecting arm 32.

Detent means is mounted on the carrier member 26 and operates to releasably restrict the member 26 against moving or shifting when the cluster 11 is in its meshed or operative position. The detent means comprises a radially extending detent member 35 which is mounted in a boss portion 36 of the carrier 26 and which is biased by a spring 37 to engage a surface of the shifter shaft 25. The shifter shaft 25 has an indentation or notch 38 which is cut in the shifter shaft 25 at a position coincident to receive the detent 35 when the gear cluster 11 is in mesh with the gear 13. The detent member 35 is characterized by having an end 35a, which is suitably shaped to fit into the notch 38 and relatively long shank portion 35b, which passes through the aperture in the boss 36 and a flat end portion 35c. Mounted on the shank 35b of the detent is a collar 39 which rests against the enlarged back portion of the end 35a. Encircling the shank 35b is the spring 37, which acts between the inner surface of the boss 36 and the collar 39 to bias the detent 35 to recess in the indentation 38.

A locking member or shaft 42 is mounted on the shifter member 26 for relative axial movement by means of axially spaced apart lugs 43 and 44, each of which are suitably apertured to receive the shaft 42. As shown in Figs. 3 and 4, the shaft 42 is substantially parallel to the shifter shaft 25. Also on the shifter member 26 is a guide shaft 46, which is slidably mounted for axial movement relative to the member 26 in coaxial bores 47 and 48 which are drilled in opposite ends of the member 26. A rigid member or drive lug 50 is affixed to the lock shaft 42 and guide shaft 46 by means of an integral hub portion 51 which is apertured to receive both the shaft 42 and 46, and which is secured against movement relative to the shafts 42, 46 by set screws 52 and 53. Surrounding the guide shaft 46 and disposed between the drive lug member 50 and a flat extended surface of the lug 44 is a spring 49 which serves as means for biasing the lug 50 and shafts 42 and 46 to the left or in a position to lock the detent 35 as shown in Figs. 2, 3, and 4. Adjustable stop means for limiting the axial movement of the locking member or locking shaft 42 is provided by a bolt 60 which is threadably mounted in a tapped bore of a lug 61 on the shifter member 26. The axis of the bolt 60 is on a continuation of the axis of the locking shaft 42 and thus the end of the bolt 60 serves as a stop for limiting axial movement of the shaft 42 relative to the shifter member 26. A lock nut 62 is provided on the bolt 60 for apparent reasons.

Associated with the transmission is the gear shift lever 64, which projects upwardly from the transmission housing 10, and has its lower end affixed to a rockshaft 65. Projecting downwardly from the rockshaft is a shifter lever 66, which has its lower end 67 disposed between the upwardly projecting arm 32 and the upwardly projecting drive lug 50.

The locking mechanism operates in the following manner. Assuming the gear cluster 11 to be in the inoperative or unmeshed position, as shown in Fig. 1, the cluster 11 may be moved to the left to its operative position by shifting the shift lever 64 to move the shifter member 26 to the left. Coincident with the gear cluster member 26 reaching the operative position, the detent means on 11 reaching the operative position, the detent means on the member 26 will also be adjacent to the notch 38 in the shifter shaft 25. The detent 35 will automatically be recessed in the indentation 38 by the biasing force of the spring 37. Likewise, upon the detent 35 reaching the recessed position, the locking member or shaft 42 will also be moved automatically and in an axial direction to the left by means of the spring 49, which normally applies the biasing force on the locking shaft 42 thereby causing the shaft 42 to shift in an overlying position to the flat end portion 35c of the detent. In this latter position, the detent 35 is locked against disengagement from the indentation 38, thus preventing shifting or movement of the shifter member and gear cluster 11.

When it is desired to move the gear cluster 11 to the inoperative position, the shift lever 64 is shifted to cause the shifter lever 66 to move to the right. Initial movement of the lug 50 to the right will first cause the lock shaft 42 to move from its overlying position relative to the detent 35, thereby releasing the detent from the locking position, and to move in contact with the end of the bolt 60. Upon further movement to the right of the shifter lever 66, the locking shaft 42, which is then in contact with the bolt 60, will cause the shifter member 26 to move to the right, thus moving the gear cluster 11 to its inoperative position. Thus, the arm 32 serves as one-way drive means for moving the shifter member 26 in one direction or into position where the gear cluster 11 is in mesh with the gear 13, and the bolt 60 in conjunction with the lug 61 serves as a second one-way drive means for moving the shifter member 26 in the opposite direction to a position where the gear 11 is out of mesh with the gear 13. Likewise, the locking mechanism is automatically applied when the gears are in mesh and is unlocked in response to movement of the shift lever 64, the lateral movement needed to unlock the locking mechanism being incorporated into the movement which is normally required to shift the gear cluster 11 to an inoperative position. Therefore, from an operator's standpoint, the locking mechanism is operated automatically.

Figs. 5 and 6 show a modification of the present invention. In the modification, a shifter member 80 is mounted on a shifter shaft 81 in a manner similar to that previously described. The shifter member 80 has an arm 82, which serves as the one-way drive means for moving the shifter member to the left and which engages the lower end 67 of the shifter lever 66. An elongated bore 85 is provided in a structural portion of the member 80 for receiving for axial movement a locking shaft 86. The right end of the shifter member 80 is provided with detent means including a detent 89, which is mounted for radial movement relative to the shifter shaft 81 in a boss portion 90 of the shifter member 80. As shown in Fig. 6, the detent is provided with a nippled end 89a, which may recess in a complementary indentation 95 on the surface of the shifter shaft 81, and is also provided with spaced apart collars 89b, 89c, which are integral portions of the detent 89, and a circumferential slot 89d as determined by the axial space between the collars 89b, 89c and which serves as the lock receiving portion of the detent 89. Surrounding the detent 89 is a spring 91, which operates to bias the detent into engagement with the indentation 95.

Fixed to the right end of the locking shaft 86 is a relatively flat plate or lock member 93 extending from the shaft 86 to a position proximate to the detent 89. A suitable opening 94 is provided in the boss 90 to permit movement of the arm 93 upon axial adjustment of the shaft 86. As is apparent from viewing Fig. 6, the arm 93 is positionable to be inserted into the circumferential slot 89d. Obviously, as the shaft 86 is moved to the right, the arm 94 is moved out of engagement with the slot 89d and the detent is then allowed to move out of the recess 95 upon overcoming the pressure of the spring 91. When the arm 93 is within the slot 89d, the detent is obviously locked in its recessed position, thereby preventing further movement of the carrier member 80.

On the left end of the locking shaft 86 is a spring 95 which is positioned between a surface of the arm 82 on the member 80 and a collar 95 which is held against axial movement relative to the shaft 86 by a pin 96 suitably fixed to the shaft 86. The spring 97 biases the shaft 86 axially to the left, thereby causing the arm 93 to insert itself in the slot 89d when the detent is in its locked or recessed position. Also mounted on the shaft 86 is a drive lug 100, which is held against both radial and axial movement relative to the shaft 86 by means of a set screw 101. The upper end of the lug 100 is positioned to engage the lower end 67 of the shifter lever 66 upon movement of the lever to the right. Positioned to intercept the hub portion of the lug 100 is an upwardly projecting lug 105 on the shifter member 80. The portion 105 serves as a stop to limit relative movement of the shaft 86 relative to the shifter member 80.

The modification operates in the following manner. Upon movement of the shifter lever 66 to the left, the shifter member 80 will move also to the left until it reaches a position in which the detent 89 will be recessed in the indentation 95. This latter position will be coincident with the gears being in mesh and in this position the spring 97 will operate to cause the arm 93 to be inserted in the slot 89d, thereby locking the detent and preventing further movement of the shifter member. When it is desired to move the shifter member to the right to disengage the gears, the shift lever is operated to move the shifter lever 66 to the right to engage the lug 100 thereby causing the lock shaft 86 and arm 93 to move to the right to unlock the detent. Substantially at the time that the arm 93 is clear of the slot 89d, the hub of the lug 100 will engage the portion 105, thereby causing further movement of the shift lever 66 to the right to move the shifter member 80 also to the right. Thus, the locking mechanism is operated in the latter modification in a manner which from an operational standpoint is automatic in that it requires no additional effort to be placed in either the locked or unlocked position.

While only one modification of the invention has been shown, it should be recognized that other forms and variations could exist without departing basically from the broad general principles herein disclosed. It should therefore be understood that while the preferred embodiments of the invention have been described with the view of clearly and concisely illustrating the invention, it is desired not to limit or narrow the invention beyond that which is claimed. For purposes of explanation, directions such as left and right, upwardly, above, and below have been used. It should be fully understood such directional words were also used only for purposes of explanation and should not be construed in a manner which would limit or narrow the appended claims.

What is claimed is:

1. A locking mechanism for use with a transmission having a part therein shiftably responsive to adjustment of a shift lever to move to and from a certain position, comprising: a shifter support mounted in the transmission; a shifter member mounted on the support for movement relative thereto and connected to the shiftable part for causing the part to shift; first one-way drive means mounted on the shifter member and engageable with the lever for moving the shifter member in one direction; detent means operative between the shifter member and the support for releasably restricting the shifter member against movement when the shiftable part is in said certain position; a lock member movable on the shifter member to a position positively locking the detent means against release and to a position permitting release of the detent means; means on the shifter member for biasing the lock member to its locking position; second one-way drive means mounted on the shifter member and engageable with the lock to move the shifter member in the opposite direction; rigid means affixed to the lock member and engageable with the lever for moving the lock member in the opposite direction, the lock member being limited in its relative movement to the shifter member whereby movement in the opposite direction will first unlock the detent means and then engage the second one-way drive means to move the shifter member in said opposite direction.

2. A locking mechanism for use with a transmission having a part therein shiftably responsive to adjustment of a shift lever to shift to and from a certain position, comprising: a shifter shaft mounted in the transmission; a shifter member mounted on the shaft for axial movement relative thereto and connected to the shiftable part for causing the part to shift; first one-way drive means mounted on the shifter member and engageable with the lever for moving the shifter member axially in one direction; detent means operative between the shifter member and the shifter shaft for releasably restricting the shifter member against movement when the shiftable part is in said certain position; a lock member movable on the shifter member to a position for positively locking the detent means against release and to a position permitting release of the detent means; means on the shifter member for biasing the lock member to its locking position; second one-way drive means mounted on the shifter shaft and engageable with the lock member to move the shifter member in the opposite direction; rigid drive means affixed to the lock member and engageable with the lever for movement in the opposite direction, the lock member being limited in its relative movement to the shifter whereby movement in the opposite direction will first unlock the detent means and then engage the second one-way drive means to move the shifter member in said opposite direction.

3. A locking mechanism for use with a transmission having a part therein shiftably responsive to adjustment of a shift lever to move to and from a certain position, comprising: a shifter shaft mounted in the transmission; a shifter member mounted on the shaft for axial movement relative thereto and connected to the shiftable part for causing the part to shift; first one-way drive means mounted on the shifter member and engageable with the lever for moving the shifter member in one direction; detent means operative between the shifter member and the shifter shaft for releasably restricting the shifter member against movement when the shiftable part is in said certain position; a lock shaft substantially parallel to the shifter shaft and movable axially on the shifter member to a position positively locking the detent means against release and to a position permitting release of the detent means; means on the shifter member for biasing the lock shaft to its locking position; second one-way drive means mounted on the shifter member and engageable with the lock shaft to move the shifter member in the opposite direction; rigid means affixed to the lock shaft engageable with the lever for moving the lock shaft in the opposite direction, the lock shaft being limited in its relative axial movement to the shifter member whereby movement in the opposite direction will first unlock the detent means and then engage the second one-way drive means to move the shifter member in said opposite direction.

4. A locking mechanism for use with a transmission having a part therein shiftably responsive to adjustment of a shift lever to shift to and from a certain position, comprising: a shifter support mounted in the transmission; a shifter member mounted on the support for movement relative thereto and connected to the shiftable part for causing the part to shift; first one-way drive means mounted on the shifter member and engageable with the lever for moving the shifter member in one direction; a spring loaded detent mounted on the shifter member and having one end thereof operative to recess in an indentation on the shifter support when the part is in said certain position thereby releasably restricting the shifter member against movement; a lock member movable on the shifter member to a detent-engaging position for positively locking the detent against release and to a detent-releasing position for releasing of the detent; means on the shifter member for biasing the lock member to its detent-engaging position; second one-way drive means mounted on the shifter and engageable with the lock member; drive means affixed to the lock member and engageable with the lever for moving the lock member in the opposite direction, the lock member being limited in its relative movement to the shifter member whereby movement of the lock member in the opposite direction will first release the detent and then engage the second one-way drive means to move the shifter member in said opposite direction.

5. A locking mechanism for use with a transmission having a part therein shiftably responsive to adjustment of a shift lever to shift to and from a certain position, comprising: a shifter support mounted in the transmission; a shifter member mounted on the support for movement relative thereto and connected to the shiftable part for causing the part to shift; first one-way drive means mounted on the shifter member and engageable with the lever for moving the shifter member in one direction; a spring loaded detent mounted on the shifter member and having one end thereof operative to recess in an indentation on the shifter support when the part is in said certain position thereby releasably restricting the shifter member against movement; a lock member movable on the shifter member to a detent-engaging position for positively locking the detent against release and to a detent-releasing position for releasing of the detent; means on the shifter member for biasing the lock member to its detent-engaging position; second one-way drive means mounted on the shifter member and engageable with the lock member; drive means affixed to the lock member and engageable with the lever for moving the lock member in the opposite direction to first release the detent and then to engage the second one-way drive means to move the shifter member in said opposite direction.

6. A locking mechanism for use with a transmission having a part therein shiftably responsive to adjustment of a shift lever to and from a certain position, comprising: a shifter shaft mounted in the transmission; a shifter member mounted on the shaft for axial movement relative thereto and connected to the shiftable part for causing the part to shift; first one-way drive means mounted on the shifter member and engageable with the lever for moving the shifter member axially in one direction; a spring loaded detent operative between the shifter member and the shifter shaft for releasably restricting the shifter member against movement when the shiftable part is in said certain position; a lock shaft substantially parallel to the shifter shaft and movable axially on the shifter member to a detent-engaging position for positively locking the detent against release and to a detent-releasing position for permitting release of the detent upon an axial force being applied to the shifter member sufficient to overcome the spring pressure of the detent; second one-way drive means mounted on the shifter member and engageable with the lock shaft in its detent-releasing position; a drive element affixed to the lock shaft and engageable with the lever for movement axially in the opposite direction, the lock shaft being limited in its axial movement relative to the shifter whereby axial movement of the lock shaft in the opposite direction first releases the detent and then engages the shifter member to move the shifter member in said opposite direction; and means on the shifter member for biasing the lock shaft axially to its detent engaging position.

7. A locking mechanism for use with a transmission having a part therein shiftably responsive to adjustment of a shift lever to move to and from an operative position, comprising: a shifter shaft mounted in the transmission having an indentation therein; a shifter supported on the shaft for axial movement; means connecting the shifter to the shiftable part whereby axial adjustment of the shifter will cause the part to shift; a detent mounted on the shifter and operative to recess in the indentation when the part is in operative position; a locking member supported on the shifter for relative movement in a direction substantially parallel to the shifter shaft and operative in a first position to cause the detent to be locked in its recessed position thereby locking the shiftable part against movement and in a second position to be engageable with the shifter to cause the latter to move in unison with the locking member; the locking member having rigid means affixed thereto engageable with the shift lever whereby movement of the lever in one direction will first cause the locking member to move from the first to the second position and additional movement of the lever in the one direction will cause the shifter to move the shiftable part from its operative position; and said shifter having a portion thereof engageable with the shift lever whereby movement of the lever in the opposite direction will cause the shiftable part to move to its operative position; and means extending between the shifter and the locking member for biasing the latter to its first position.

8. A locking mechanism for use with a transmission having a part therein shiftably responsive to adjustment of a shift lever to move to and from an operative position, comprising: a shifter shaft mounted in the transmission having an indentation therein; a shifter supported on the shaft for axial movement; means connecting the shifter to the shiftable part whereby axial adjustment of the shifter will cause the part to shift; a detent mounted on the shifter and operative to have one end thereof recess in the indentation when the part is in operative position; a locking shaft substantially parallel to the shifter shaft supported on the shifter for axial movement and operative in a first axial position to engage an opposite end of the detent to cause the detent to be held in its recessed position thereby locking the shiftable part against movement and in a second axial position to be engageable with the shifter to cause the latter to move in unison with the locking shaft; the locking shaft having rigid means affixed thereto engageable with the shift lever whereby movement of the lever in one direction will first cause the locking shaft to move axially from the first to the second position and additional movement of the lever in the one direction will move the shifter axially in the one direction thereby moving the shiftable part from its operative position; and said shifter having a portion thereof engageable with the shift lever whereby movement of the lever in the opposite direction will cause the shiftable part to move to its operative position; and means extending between the shifter and the locking shaft for biasing the latter to its first axial position.

9. A locking mechanism for use with a transmission having a part therein shiftably responsive to adjustment of a shift lever to move to and from a certain position, comprising: a shifter shaft mounted in the transmission; a shifter member mounted on the shaft for axial movement relative thereto and connected to the shiftable part for causing the part to shift; first one-way drive means mounted on the shifter member and engageable with the lever for moving the shifter member in one direction; detent means operative between the shifter member and the shifter shaft for releasably restricting the shifter member against movement when the shiftable part is in said certain position; a lock shaft substantially parallel to the shifter shaft and movable axially on the shifter member; a lock member affixed to the lock shaft and responsive to axial movement of the lock shaft to move to a position positively locking the detent means against release and to a position permitting release of the detent means; means on the shifter member for biasing the lock to its locking position; second one-way drive means mounted on the shifter member and engageable with the lock shaft to move the shifter member in the opposite direction; rigid means affixed to the lock shaft engageable with the lever for moving the lock shaft in the opposite direction, the lock shaft being limited in its relative axial movement to the shifter member whereby movement in the opposite direction will first unlock the detent means and then engage the second one-way drive means to move the shifter member in said opposite direction.

10. A locking mechanism for use with a transmission having a part therein shiftably responsive to adjustment of a shift lever to move to and from an operative position, comprising: a shifter shaft mounted in the transmission having an indentation therein; a shifter supported on the shaft for axial movement; means connecting the shifter to the shiftable part whereby axial adjustment of the shifter will cause the part to shift; a detent mounted on the shifter member and operative to have one end thereof recess in the indentation when the part is in operative position and having a lock receiving portion thereon; a lock shaft substantially parallel to the shifter shaft supported on the shifter for relative axial movement; a lock member fixed to the lock shaft and operative in a first axial position of the lock shaft to engage the lock receiving portion of the detent to cause the detent to be held in its recessed position thereby locking the shiftable part against movement and in a second axial position of the lock shaft to be engageable with the shifter to cause the latter to move in unison with the lock shaft; the lock shaft having rigid means affixed thereto engageable with the shift lever whereby movement of the lever in one direction will first cause the lock shaft to move axially from the first to the second position and additional movement of the lever in the one direction will move the shifter axially in the one direction thereby moving the shiftable part from its operative position; and said shifter having a portion thereof engageable with the shift lever whereby movement of the lever in the opposite direction will cause the shiftable part to move to its operative position; and means extending between the shifter and the lock shaft for biasing the latter to its first axial position.

11. A locking mechanism for use with a transmission having a part therein shiftably responsive to adjustment of a shift lever to shift to and from a certain position, comprising: a shifter support mounted in the transmission; a shifter member mounted on the support for movement relative thereto and connected to the shiftable part for causing the part to shift; first one-way drive means mounted on the shifter member and engageable with the lever for moving the shifter member in one direction; detent means between the shifter member and the shifter support releasably restricting the shifter member against movement; a lock member movable on the shifter member biased to a detent-engaging position for positively locking the detent against release; second one-way drive means mounted on the shifter member and engageable with the lock member; and drive means affixed to the lock member and engageable with the lever for moving the lock member in the opposite direction to first release the detent and then to engage the second one-way drive means to move the shifter member in said opposite direction.

References Cited in the file of this patent
UNITED STATES PATENTS

| | | |
|---|---|---|
| 1,220,790 | Schlatter | Mar. 27, 1917 |
| 1,976,697 | Fishburn | Oct. 9, 1934 |
| 2,487,283 | Stewart et al. | Nov. 8, 1949 |
| 2,598,428 | Plexico | May 27, 1952 |